(12) United States Patent
Hagen et al.

(10) Patent No.: US 12,153,443 B2
(45) Date of Patent: Nov. 26, 2024

(54) METHOD FOR CONTROLLING A FLIGHT MOVEMENT OF AN AERIAL VEHICLE FOR LANDING OR FOR DROPPING A CARGO, AND AERIAL VEHICLE

(71) Applicant: Spleenlab GmbH, Saalburg-Ebersdorf (DE)

(72) Inventors: Chris Hagen, Bad Lobenstein (DE); Florian Ölsner, Jena (DE); Stefan Milz, Saalburg-Ebersdorf (DE)

(73) Assignee: Spleenlab GmbH, Saalburg-Ebersdorf (DE)

( * ) Notice: Subject to any disclaimer, the term of this patent is extended or adjusted under 35 U.S.C. 154(b) by 244 days.

(21) Appl. No.: 17/837,930

(22) Filed: Jun. 10, 2022

(65) Prior Publication Data
US 2022/0397913 A1 Dec. 15, 2022

(30) Foreign Application Priority Data
Jun. 11, 2021 (DE) .................. 10 2021 115 140.6

(51) Int. Cl.
*G06T 7/70* (2017.01)
*B64C 39/02* (2023.01)
(Continued)

(52) U.S. Cl.
CPC .......... *G05D 1/0676* (2013.01); *B64C 39/024* (2013.01); *B64D 47/08* (2013.01);
(Continued)

(58) Field of Classification Search
CPC ...... B60W 10/06; B60W 10/08; B60W 10/18; B60W 10/30; B60W 2520/26;
(Continued)

(56) References Cited

U.S. PATENT DOCUMENTS

2018/0290748 A1  10/2018  Corban et al.
2018/0322749 A1  11/2018  Kempel et al.
(Continued)

FOREIGN PATENT DOCUMENTS

CN    110197489       9/2019
CN    110197489 A  *  9/2019  .......... G06K 9/0063
(Continued)

OTHER PUBLICATIONS

Lee et al, "Landing Area Recognition Using Deep Learning for Unmanned Aerial Vehicles", 2020 International Conference on Advanced Robotics and Intelligent Systems, Aug. 19, 2020.
(Continued)

*Primary Examiner* — Charles J Han
(74) *Attorney, Agent, or Firm* — Boyle Fredrickson, S.C.

(57) ABSTRACT

The preferred embodiments relate to a method for controlling a flight movement of an aerial vehicle for landing the aerial vehicle, including: recording of first image data by means of a first camera device, which is provided on an aerial vehicle, and is configured to record an area of ground, wherein the first image data is indicative of a first sequence of first camera images. The method also includes recording of second image data by means of a second camera device, which is provided on the aerial vehicle, and is configured to record the area of ground, wherein the second image data is indicative of a second sequence of second camera images.

10 Claims, 2 Drawing Sheets

(51) Int. Cl.
  *B64D 47/08* (2006.01)
  *B64U 70/00* (2023.01)
  *G05D 1/00* (2024.01)
  *G06V 10/82* (2022.01)
  *G06V 20/17* (2022.01)
  *B64U 101/30* (2023.01)
  *B64U 101/60* (2023.01)

(52) U.S. Cl.
  CPC ........... *G05D 1/0688* (2019.05); *G05D 1/106* (2019.05); *G06T 7/70* (2017.01); *G06V 10/82* (2022.01); *G06V 20/17* (2022.01); *B64U 70/00* (2023.01); *B64U 2101/30* (2023.01); *B64U 2101/60* (2023.01); *B64U 2201/10* (2023.01); *G06T 2207/10032* (2013.01); *G06T 2207/20084* (2013.01); *G06T 2207/30261* (2013.01)

(58) Field of Classification Search
  CPC ........... B60W 30/02; B60W 30/18136; B60W 40/08; B60W 40/10
  See application file for complete search history.

(56) References Cited

U.S. PATENT DOCUMENTS

| | | |
|---|---|---|
| 2019/0056726 A1 | 2/2019 | Weldemariam et al. |
| 2020/0258400 A1* | 8/2020 | Yuan .................. G06F 18/2413 |
| 2020/0301427 A1 | 9/2020 | Restifo et al. |

FOREIGN PATENT DOCUMENTS

| | | |
|---|---|---|
| DE | 10 2018 125 629 | 5/2019 |
| WO | 2018081952 | 5/2018 |
| WO | 2019152312 | 8/2019 |

OTHER PUBLICATIONS

Symeonidis et al., "Vision-Based UAV Safe Landing Exploiting Lightweight Deep Neural Networks", Proceedings of the 10th International Conference of Information Systems and Technologies, Jan. 1, 2021.

* cited by examiner

METHOD FOR CONTROLLING A FLIGHT MOVEMENT OF AN AERIAL VEHICLE FOR LANDING OR FOR DROPPING A CARGO, AND AERIAL VEHICLE

BACKGROUND OF THE INVENTION

Field of the Invention

The invention relates to a method for controlling a flight movement of an aerial vehicle for landing the aerial vehicle or for dropping a cargo by means of the aerial vehicle, together with an aerial vehicle.

Description of Related Art

Aerial vehicles are of known art as manned and unmanned aerial vehicles. The flight movement of the aerial vehicle is controlled with the aid of a control device, which provides control signals in order to control, for example, propulsion devices and rudders. In this context, when determining the control signals for the flight movement of the aerial vehicle, it is of known art to take into account sensor signals from a sensor device, which register environmental parameters for the environment of the aerial vehicle, and to execute the flight movement as a function of such sensor signals.

SUMMARY OF THE INVENTION

The object of the invention is to provide a method for controlling a flight movement of an aerial vehicle for landing, or for dropping a cargo in a clear landing/drop zone, and to provide an aerial vehicle, which enables an efficient and reliable control of the aerial vehicle as a function of the conditions on the ground.

This is achieved by a method for controlling a flight movement of an aerial vehicle for landing the aerial vehicle, and a method for controlling a flight movement of an aerial vehicle for dropping a cargo by means of the aerial vehicle. Also, provided is a respective aerial vehicle. Embodiments are the subject matter of dependent subsidiary claims.

In accordance with one aspect, a method is provided for controlling a flight movement of an aerial vehicle for landing the aerial vehicle, the method comprising: recording of first image data by means of a first camera device, which is provided on an aerial vehicle and is configured to record an area of ground, wherein the first image data is indicative of a first sequence of first camera images; recording second image data by means of a second camera device, which is provided on an aerial vehicle, and is configured to record the area of ground, wherein the second image data is indicative of a second sequence of second camera images; and processing of the first and second image data by means of an evaluation device. The processing of the first and the second image data comprises the following: performing of a first image analysis based on artificial intelligence, for the first image data, wherein at least a first landing zone is hereby determined in the recorded area of ground; performing of a second image analysis, which is conducted free of (without) use or application of artificial intelligence, for the second image data, wherein at least a second landing zone is hereby determined in the recorded area of ground; determining position coordinates for a clear landing zone, which is comprised by the first and second landing zones, if a comparison reveals that the first and second landing zones in the area of ground overlap, at least in the clear landing zone; receiving of position coordinates for a target landing site by a control device of the aerial vehicle; determining release characteristics, if a comparison of the position coordinates for the clear landing zone and the position coordinates for the target landing site reveals a match; and transmission of release characteristics, which are indicative of the availability of the target landing site for a landing, to the control device of the aerial vehicle. A flight movement of the aerial vehicle is controlled by the control device, for landing at the target landing site.

In accordance with one aspect, a method is generated for controlling a flight movement of an aerial vehicle, for dropping a cargo by the aerial vehicle, which comprises the following: recording of first image data by means of a first camera device, which is provided on an aerial vehicle, and is configured to record an area of ground, wherein the first image data is indicative of a first sequence of first camera images; recording of second image data by means of a second camera device, which is provided on an aerial vehicle, and is configured to record an area of ground, wherein the second image data is indicative of a second sequence of second camera images; and processing of the first and second image data by means of an evaluation device. Processing of the first and second image data comprises the following: performing of a first image analysis based on artificial intelligence, for the first image data, wherein at least a first drop zone is hereby determined, for dropping a cargo of the aerial vehicle in the recorded area of ground; performing of a second image analysis, which is conducted free of use of artificial intelligence, on the second image data, wherein at least a second drop zone is hereby determined for dropping a cargo of the aerial vehicle in the recorded area of ground; determining of position coordinates for a clear drop zone comprised by the first and second drop zones, if a comparison reveals that the first and second drop zones in the area of ground overlap, at least in the clear drop zone; receiving of position coordinates for a target drop site by a control device of the aerial vehicle; determining of release characteristics, if a comparison of the position coordinates for the clear drop zone and the position coordinates for the target drop site reveals a match; and transmitting of the release characteristics registering the availability of the target drop site for dropping the cargo to the control device of the aerial vehicle. A flight movement of the aerial vehicle is controlled by the control device for dropping the cargo at the target drop site.

In accordance with a further aspect, an aerial vehicle is created, which comprises the following: a sensor device, which has a first and a second camera device; an evaluation device, which has one or a plurality of processors; and a control device, configured to controlling a flight movement of the aerial vehicle. For landing the aerial vehicle the aerial vehicle is configured for the following: recording of first image data by means of a first camera device, which is provided on an aerial vehicle, and is configured to record an area of ground, wherein the first image data is indicative of a first sequence of first camera images; recording of second image data by means of a second camera device provided on the aerial vehicle, and configured to record the area of ground, wherein the second image data is indicative of a second sequence of second camera images; and processing of the first and the second image data by means of an evaluation device. The processing of the first and second image data comprises the following: performing of a first image analysis based on artificial intelligence, for the first image data, wherein at least a first landing zone is hereby determined in the recorded area of ground; performing of a second image analysis, without the use of artificial intelligence, on the second image data, wherein at least a second landing zone is hereby determined in the recorded area of ground; determining of position coordinates for a clear landing zone, which is comprised by the first and second landing zones, if a comparison reveals that the first and second landing zones in the area of ground overlap, at least in the clear landing zone; receiving of position coordinates for a target landing site by a control device of the aerial vehicle; determining of release characteristics, if a comparison of the position coordinates for the clear landing zone and the position coordinates for the target landing site reveals a match; and transmitting of release characteristics, which register the availability of the target landing site for a landing, to the control device of the aerial vehicle. The aerial vehicle is configured to controlling a flight movement for landing at the target landing site.

In accordance with a further aspect, an aerial vehicle is provided, comprising: a sensor device, which has a first and a second camera device; an evaluation device, which has one or a plurality of processors; and a control device, which is configured to controlling a flight movement of the aerial vehicle. The aerial vehicle is configured for execution of a landing comprising the following: recording of first image data by means of a first camera device, which is provided on an aerial vehicle and is configured to record an area of ground, wherein the first image data is indicative of a first sequence of first camera images; recording of second image data by means of a second camera device, which is provided on the aerial vehicle and is configured to record the area of ground, wherein the second image data is indicative of a second sequence of second camera images; and processing of the first and the second image data by means of an evaluation device. The processing of the first and second image data comprises the following: performing of a first image analysis based on artificial intelligence, on the first image data, wherein here at least a first drop zone is determined for dropping a cargo of the aerial vehicle in the recorded area of ground; performing of a second image analysis, not based on artificial intelligence, on the second image data, wherein here at least a second drop zone is determined for dropping a cargo of the aerial vehicle in the recorded area of ground; determining of position coordinates for a clear drop zone comprised by the first and second drop zones, if a comparison reveals that the first and second drop zones overlap in the area of ground, at least in the clear drop zone; receiving of position coordinates for a target drop site by a control device of the aerial vehicle; determining of release characteristics, if a comparison of the position coordinates for the clear drop zone and the position coordinates for the target drop site reveals a match; and transmitting of release characteristics, which register the availability of the target drop site, for dropping the cargo, to the control device of the aerial vehicle. The aerial vehicle is configured to controlling a flight movement of the aerial vehicle, for dropping the cargo at the target drop site.

The proposed technology provides a plurality of camera devices on the aerial vehicle, which record particular image data for the environment of the aerial vehicle during the flight movement, wherein the image data display a sequence of camera images in each case. For evaluation of the image data by means of the evaluation device, a redundant image analysis is provided, which operates with one image analysis that is based on artificial intelligence, together with another image analysis that is not based on artificial intelligence, so that with image analyses that are independent of one another a check is made as to whether a clear landing/drop zone can be determined from the recorded image data for the observed area of ground. This is the case if, by means of the first and second image analyses, certain landing/drop zones, which in particular are clear of ground obstacles that could hinder the landing/dropping of the cargo, register or are indicative of an overlap zone on the ground, which is then completely, or only partially, comprised by the clear landing/drop site. Position coordinates are determined for the clear landing/drop site, which are compared with position coordinates for an (intended or desired) target landing site. In the event of a match, release characteristics are provided, which register or are indicative of the availability of the target landing/drop site. On this basis, the control device can control the flight movement of the aerial vehicle appropriately, for landing/dropping the cargo. Both an image analysis based on artificial intelligence and a classical image analysis (not based on artificial intelligence) are used, independently of each other, for the evaluation of the image data recorded with a plurality of camera devices.

The performing of the first image analysis and/or the second image analysis can further comprise the following: providing obstacle characteristics, which register at least one category of ground obstacle; determining of a landing zone as unsuitable for landing or dropping the cargo, if it is determined in the first and/or second image analyses, using the obstacle characteristics, that a ground obstacle is located in the landing/drop zone, which can be assigned to the at least one category of ground obstacle; and continuation of the processing of the first and second image data, using the first and second image analyses, until the clear landing/drop zone is determined.

Obstacle characteristics can be provided, which register or are indicative of one or a plurality of the following categories of ground obstacles: moving ground obstacle, stationary ground obstacle, human, plant and animal.

In the first image analysis, an optical data stream can be applied to determine a movement for a ground obstacle. For example, an optical data stream shows a movement path for one or a plurality of image pixels in the camera images, and can thus register a movement for any image pixels associated with the ground obstacle, which is an indication of the ground obstacle that is moving. In general, an optical data stream of an image sequence is understood to be a vector field of a velocity of one or a plurality of image pixels projected into the image plane into the space (environment) that is being observed. The optical data stream is thus a representation of movement information in the context of the image analysis.

The first and the second image data can be recorded by means of at least two different camera devices from the following group: a visual imaging camera, a thermal imaging camera, a radar camera, an event camera and an infrared camera. In one configuration, provision can be made to examine image data from more than two camera devices by means of respective image analysis, in order to determine at least one landing/drop zone in each case.

The event camera uses neuromorphic visual sensors. Instead of delivering a sequence of images at a constant frequency (visual imaging camera), event cameras (only) send information from those pixels (image data) in which the brightness has changed significantly. Such pixel-by-pixel changes are also called events, which are time-stamped with microsecond accuracy and transmitted asynchronously immediately afterwards. Since only non-redundant information is transmitted, event cameras are energy-efficient and are capable of recording very fast movements. In doing so, they directly address the trade-off between energy demand and latency. In addition, event cameras can be used that have a dynamic range of, for example, more than about 140 dB (compared to standard cameras with typically around 60 dB), because each pixel is independent.

In one embodiment, provision can be made to process the image data provided by the visual imaging camera in the context of the first image analysis based on artificial intelligence, for example by means of a neural network such as CNN, and thus to execute a pixel-by-pixel classification, for example one class per image pixel: building, vegetation, human, animal, water, or the like.

In one configuration, the sensor signals of the thermal imaging camera (image data) are evaluated by means of the second image analysis, which is conducted or performed free of (without) use of artificial intelligence. Here, a threshold filter can be applied to the sensor signals, which pixel-by-pixel reproduces the heat per pixel. The image data of the thermal imaging camera are suitable for detecting and determining, for example, people, animals and/or vehicles by means of a deterministic analysis (for example using a threshold filter). The image data of the event-based camera can also be evaluated alternatively or additionally for this purpose, as it concerns moving objects. Here a threshold filter can also be used for image data analysis.

The method can furthermore comprise the following: performing of a visual analysis for the first/second camera device, wherein it is hereby determined as to whether a particular recorded field of view (camera field of view) of the first/second camera device is free of blockage. In this way, it is ensured that the recorded or detected field of view for the camera devices is not blocked in either case, so that the image data is recorded with sufficient reliability then to perform an image analysis that meets the safety requirements for the landing/dropping of the cargo.

The visual analysis can determine the extent to which the recorded field of view of the first camera device and/or the second camera device is blocked, and field of view characteristics can be prepared in the evaluation device and transmitted to the control device, registering the extent of blockage of the recorded field of view. In this way, the control device of the aerial vehicle receives information as to whether and, if so, to what extent, the recorded field of view of one or more camera devices is blocked, for example due to contamination. Safety measures can be undertaken on this basis. For example, provision can be made for the image data from a camera device whose field of view is partially blocked to be excluded from the image data analysis. Alternatively, in the event of a (partial) blockage of the field of view, a landing and/or a dropping of the cargo can be prevented, even though a clear landing/drop zone has been previously determined.

The control device of the aerial vehicle can be checking or analyzing the field of view characteristics and controlling the aerial vehicle's flight movement accordingly if the field of view characteristics register an extent of the blockage of the recorded field of view for the first camera device and/or the second camera device that exceeds a threshold, wherein the emergency landing control signals are configured to effect an emergency landing of the aerial vehicle. In this case, the threshold exceedance registers a situation in which reliable control of the flight movement based on the recorded image data is potentially no longer available, and an emergency landing is therefore initiated. In conjunction with such an emergency landing, provision can be made that this is executed in a landing zone that has been determined only from the first image analysis, or only from the second image analysis.

In the first image analysis, one or more of the following characteristics for the ground obstacle can be determined by means of an analysis algorithm based on artificial intelligence: height of the ground obstacle, width of the ground obstacle, and a confidence value for the determination of the ground obstacle in the first camera images. In the context of the image analysis based on artificial intelligence, provision can be made for a frame or box to be determined around the ground obstacle in the first camera images by means of the analysis algorithm used, whereby an image zone of the first camera images is determined, in which there is a confident probability that the ground obstacle is present. The frame can be determined such that it registers outer boundaries of the ground obstacle in the first camera images, from which the height and/or width of the ground obstacle can be determined.

In the first image analysis, by means of an analysis algorithm based on artificial intelligence, a neural network can be used. The previously trained neural network processes the image data directly in the image analysis based on artificial intelligence. Different layers of the neural network can be run through, until finally characteristics in image coordinates (pixel coordinates, frame size, object class, as well as confidence value) are estimated directly. The landing zone/drop zone can be determined by means of the camera parameters (calibration) from the characteristics of the neural network, together with the object class determined.

In one configuration, the first image analysis using artificial intelligence can be executed using an algorithm based on machine learning, and the second image analysis, which does not use artificial intelligence, can be executed using an algorithm that is not based on machine learning.

Thus a method for controlling a flight movement of an aerial vehicle can be generated, which comprises the following: recording of first image data by means of a first camera device, which is provided on an aerial vehicle, and is configured to record an area of ground, wherein the first image data is indicative of a first sequence of first camera images; recording of second image data by means of a second camera device, which is provided on an aerial vehicle, and is set up to record an area of ground, wherein the second image data is indicative of a second sequence of second camera images; and processing of the first and second image data by means of an evaluation device. The processing of the first and second image data comprises the following: performing of a first image analysis based on artificial intelligence, for the first image data, wherein at least a first area of ground is hereby determined in the recorded area of ground; performing of a second image analysis, which is conducted or executed free of use of artificial intelligence, for the second image data, wherein at least a second area of ground is hereby determined in the recorded area of ground; determining of position coordinates for a clear area of ground, which is comprised by the first and second areas of ground, if a comparison reveals that the first and second areas of ground overlap at least in the clear area of ground; receiving of position coordinates for a target location in the monitored area of ground by a control device of the aerial vehicle; determining of release characteristics, if a comparison of the position coordinates for the clear area of ground and the position coordinates for the target location reveals a match; and transmitting of release characteristics, which register the availability of the target location, to the control device of the aerial vehicle. A flight movement of the aerial vehicle can then be controlled by the control device for dropping a cargo from the aerial vehicle, and/or landing the aerial vehicle, at the target location.

The embodiments explained above in conjunction with the method for controlling the flight movement of the aerial vehicle can accordingly be provided in the context of the aerial vehicle. The aerial vehicle can take the form of a manned or unmanned aerial vehicle.

The camera devices, together with the evaluation device, can be accommodated together in a sensor module or device, which is mounted on the aerial vehicle as a complete detachable unit.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

In what follows further embodiments are explained in more detail with reference to figures. Here.

DETAILED DESCRIPTION OF THE PREFERRED EMBODIMENTS

Figure 1:
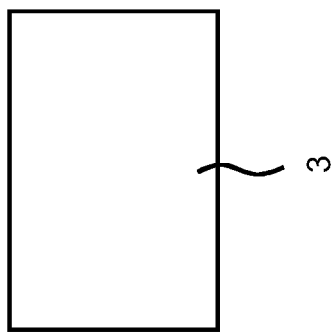
FIG. 1 shows a schematic representation of an arrangement with a sensor device and an evaluation device.
Figure 1:
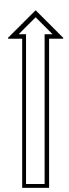
Figure 1:
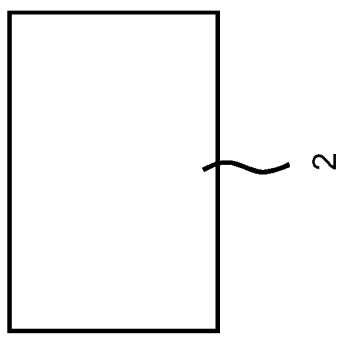
Figure 1:
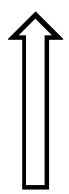
Figure 1:
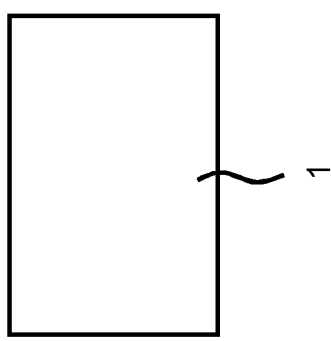

FIG. 1 shows a schematic representation of an arrangement of functional components for use in controlling a flight movement of an aerial vehicle, comprising a sensor device 1 and an evaluation device 2, which is set up to evaluate image data recorded by means of the sensor device 1 so as to determine a clear area of ground in an observed area of ground, so that, on this basis, a control device 3 of the aerial vehicle can control the flight movement of the aerial vehicle such that the aerial vehicle lands in the clear area of ground (control of a landing of the aerial vehicle), and/or drops a cargo of the aerial vehicle onto the clear area of ground (control of the dropping of a cargo of the aerial vehicle).

Figure 2:
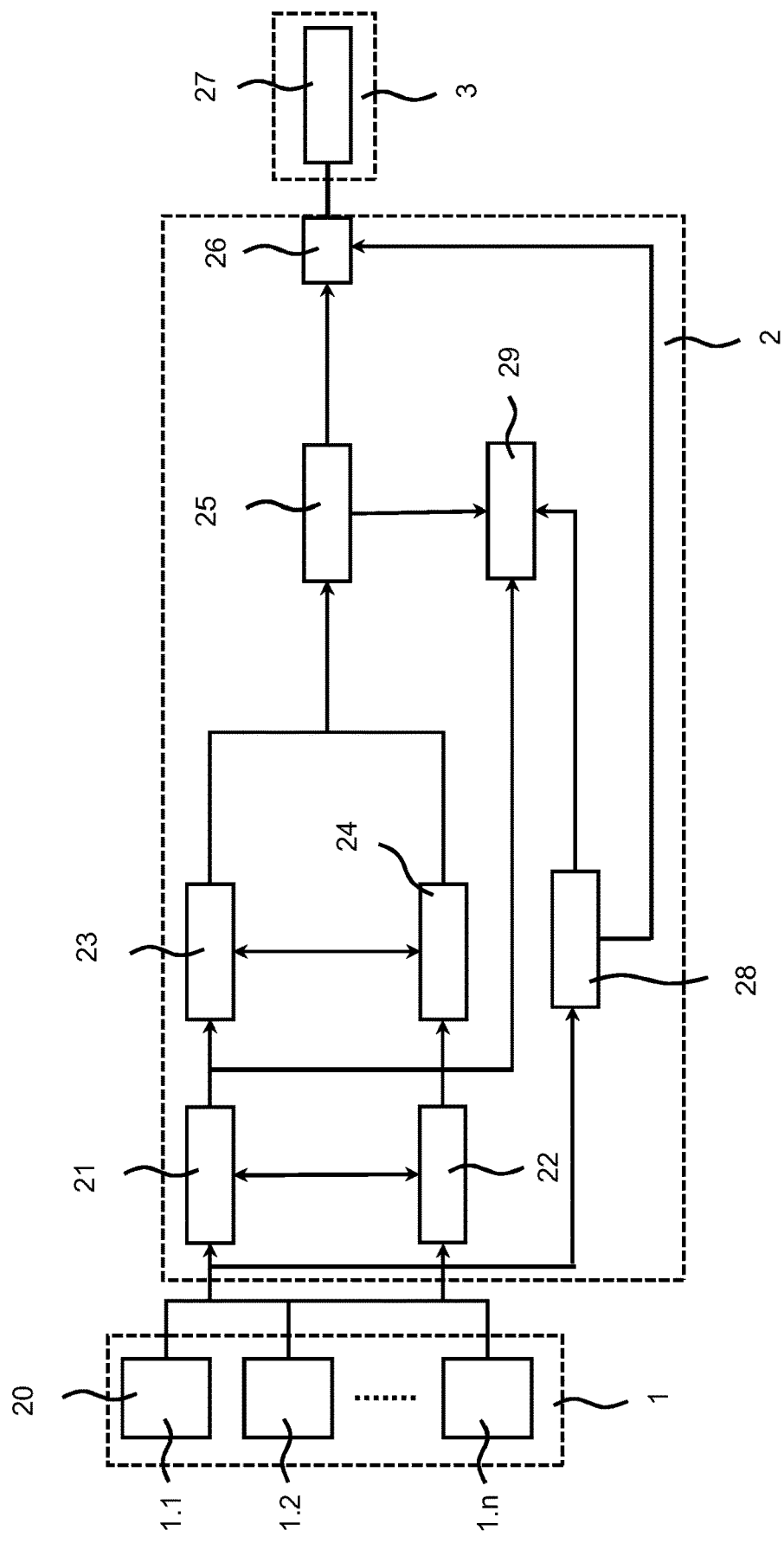
FIG. 2 shows a schematic representation of a method for controlling a flight movement of an aerial vehicle.

In accordance with FIG. 2, the sensor device 1 comprises a plurality of camera devices 1.1, . . . , 1.n, each of which is set up to observe an environment of the aerial vehicle during its flight movement. The plurality of camera devices 1.1, . . . , 1.n are each oriented towards the ground, and are set up to record particular image data for the observed area of ground, wherein the image data register a sequence of camera images. The camera devices 1.1, . . . , 1.n can comprise, for example, one or more of the following types of camera: thermal imaging camera, a visual imaging camera, an infrared camera, a multispectral camera, and an event-based camera.

The image data recorded in a step 20 are transmitted from the sensor device 1 to the evaluation device 2, where the camera images are processed. A redundant image analysis is executed for the image data in the evaluation device 2 by means of data processing.

Prior to image analysis for the determination of at least one clear area of ground for landing and/or dropping a cargo, data pre-processing is provided, in the example of embodiment, in steps 21 and 22.

Here, in step 21, first image data, for example RGB image data (from a visual imaging camera), of a first camera device 1.1 are preprocessed in the evaluation device 2.

In step 21, second image data, for example thermal imaging camera image data, of a second camera device 1.2, are independently preprocessed in the evaluation device 2.

Then, in a first image analysis (step 23), the first image data is analyzed, using an analysis algorithm based on artificial intelligence. In one example of embodiment, the first image analysis is executed by means of a neural network, for example a convolutional neural network (CNN) or a visual transformer. For this purpose, the pixel data are processed directly as RGB values by the neural network and modified by means of different layers. By means of the neural network such as CNN, a pixel-by-pixel classification can be executed, for example, one class per image pixel: building, vegetation, human, animal, water, or the like. The output of the neural network is directly in the form of the characteristics in image coordinates. The neural network has previously been trained using training data, as is of known art in various forms of embodiment.

Independently of the first image analysis based on artificial intelligence, the second image data are analyzed by the sensor device 1 in a second image analysis (step 24), wherein the second image analysis is executed by means of a classical analysis algorithm that does not use artificial intelligence. In the second image analysis, for example, the image data from at least a second camera device 1.2 can be evaluated. Here, a threshold filter can be applied to the sensor signals from the thermal imaging camera, which reproduces the heat per pixel on a pixel-by-pixel basis. The image data from the thermal imaging camera are suitable for detecting and determining, for example, people, animals, and/or vehicles by means of deterministic analysis (for example threshold filters). The image data of the event-based camera can also be evaluated alternatively or additionally for this purpose, as it concerns moving objects. A threshold filter can also be used for image data analysis.

Both image analyses, which are executed independently of each other, serve to check whether the image data register a clear area of ground that is currently available for a landing and/or for dropping a cargo.

In step 25, the results of the two image analyses are combined. Position coordinates for a clear area of ground (landing zone/drop zone) are determined if the clear area of ground lies in an overlap zone of a first area of ground, which was determined in the context of the first image analysis, and a second area of ground, which was determined in the context of the second image analysis, independently of the first image analysis. Here, position coordinates for a target zone/location are received in the evaluation device 2 from the control device 3 of the aerial vehicle; these register a desired target location for landing the aerial vehicle, and/or for dropping a cargo by the aerial vehicle. Release characteristics are then determined in the evaluation device 2 if a comparison of the position coordinates for the clear area of ground that has been found, and the position coordinates for the target zone on the ground, reveals a match, so that the desired target location is available. Otherwise, the search for a clear area of ground can be continued in accordance with the method described above. Alternatively, the control unit 3 of the aerial vehicle can provide modified position coordinates for an alternative target zone/location, whereupon the comparison with the position coordinates for the clear area of ground that has been found can be executed for the modified position coordinates.

The release characteristics are then provided and transmitted to an interface in step 26 for transmission to the control device 3 of the aerial vehicle, whereupon the aerial vehicle is controlled by the control device 3 for landing and/or dropping the cargo accordingly (step 28).

In order to increase further the reliability of the determination of the clear or suitable area of ground, provision is optionally made in the example of embodiment shown in step 28 to execute a visual analysis for one or a plurality of the camera devices 1.1, ..., 1.n before determining the position coordinates for the clear area of ground, and/or before transmitting the release characteristics to the control device 3. The visual analysis is used to check whether a particular assigned recorded field of view of the camera devices 1.1, ..., 1.n may at least partially be blocked. If the recorded field of view is blocked, the assigned camera device may no longer be able to fulfil its sensor task reliably. Here provision can be made for field of view characteristics to be generated and transmitted to the control device 3, wherein the field of view characteristics register whether and, if so, to what extent, the recorded field of view of one or more of the camera devices 1.1, ..., 1.n is blocked. If the extent of a blockage for at least one recorded field of view exceeds a threshold value, the control device 3 can, for example, reject the previous determination of the clear area of ground, and transmit no release characteristics to the control device 3, despite the fact that the clear area of ground has been found. Alternatively or additionally, an emergency landing of the aerial vehicle can be initiated.

In addition to the visual analysis, or as an alternative to the latter (step 29), provision can be made for one or a plurality of further checks to be executed for the sensor device 1 and/or the evaluation device 2. For this purpose, a system status, for example, of the power supply, and/or the utilisation of a processor unit, the current runtime of the artificial intelligence, and/or a time synchronisation of the camera devices 1.1, ..., 1.n, is continuously monitored, either in terms of individual characteristics, or in groups, for example at regular time intervals.

Based on the release characteristics received from the evaluation device 2, the control device 3 then controls the aerial vehicle such that a landing of the aerial vehicle, and/or a dropping of a cargo by the aerial vehicle in the target zone (target landing site/location, target drop site/location) are executed.

The features disclosed in the above description, in the claims, as well as in the figures, can be of importance both individually and in any combination for the implementation of the various embodiments.

What is claimed is:

1. A method for controlling a flight movement of an aerial vehicle for landing the aerial vehicle, comprising:
    recording first image data using a first camera, wherein the first camera is provided on an aerial vehicle, and is configured to record an area of ground, wherein the first image data is indicative of a first sequence of first camera images;
    recording of second image data using a second camera, wherein the second camera is provided on an aerial vehicle and is configured to record an area of ground, wherein the second image data is indicative a second sequence of second camera images;
    processing the first and the second image data using an evaluation computer, comprising:
        performing a first image analysis using a neural network and an artificial intelligence algorithm based on machine learning, of the first image data, wherein at least a first landing zone is hereby determined in the recorded area of ground;
        performing a second image analysis, which is conducted free of use of the artificial intelligence algorithm, of the second image data, wherein at least a second landing zone is hereby determined in the recorded area of ground;
        determining position coordinates of a clear landing zone, which is comprised by the first and second landing zones, when a comparison reveals that the first and second landing zones overlap in the area of ground, at least in the clear landing zone;
        receiving position coordinates of a target landing site by a control processor of the aerial vehicle;
        determining release characteristics, when a comparison of the position coordinates of the clear landing zone and the position coordinates of the target landing zone reveals a match; and
        transmitting the release characteristics, which are indicative of an availability of the target landing site for a landing, to the control processor of the aerial vehicle; and
        controlling a flight movement of the aerial vehicle by the control processor, so as to land the aerial vehicle on the target landing site;
    wherein the first camera is a visual imaging camera, and wherein performing the first image analysis comprises determining a ground obstacle via determining movement in the first image data based on an optical stream;
    wherein the second camera is a thermal imaging camera, and wherein performing the second image analysis comprises determining heat in the second image data based on a threshold filter; and
    wherein at least one of the first and second landing zones is determined as unsuitable for landing when, during the first and/or the second image analysis, it is determined that a ground obstacle is located in the at least one of the first and second landing zones.

2. The method according to claim 1, wherein the performing the first image analysis, and/or the second image analysis, further comprises the following:
    providing obstacle characteristics, which are indicative of at least one category of ground obstacle;
    determining a landing zone as unsuitable for the landing or the dropping of the cargo, when, with the first and/or second image analyses, using the obstacle characteristics, it is determined that a ground obstacle is arranged in the landing/drop zone, which can be assigned to the at least one category of ground obstacle; and
    continuing with processing of the first and the second image data using the first and second image analyses until the clear landing/drop zone is determined.

3. The method according to claim 2, wherein obstacle characteristics are provided, which are indicative of one or a plurality of the following categories of ground obstacle:
    moving ground obstacle, stationary ground obstacle, human, plant, and animal.

4. The method according to claim 1, wherein furthermore the following is provided:
    performing a visual analysis of the first/second camera, wherein it is determined to whether a particular recorded field of view of the first/second camera is clear of any field of view blockage.

5. The method according to claim 4, wherein in the course of the visual analysis it is determined as to what extent the recorded field of view of the first camera, and/or of the second camera is blocked, and field of view characteristics are provided in the evaluation computer and transmitted to the control processor, which characteristics register the extent of the blocking of the recorded field of view.

6. The method according to claim 5, wherein the control processor is checking the field of view characteristics, and is controlling the flight movement of the aerial vehicle in accordance with emergency landing control signals, when the field of view characteristics register an extent of blockage of the recorded field of view for the first camera and/or the second camera, which exceeds a threshold value, wherein the emergency landing control signals are set up to effect an emergency landing of the aerial vehicle.

7. The method according to claim 1, wherein the neural network is a convolutional neural network or a visual transformer.

8. An aerial vehicle, comprising:
a sensor device, comprising a first and a second camera;
an evaluation computer, comprising at least one processor; and
a control processor, configured to control an operation of the aerial vehicle so as to land the aerial vehicle;
wherein the control processor is further configured for:
recording first image data using a first camera, wherein the first camera is provided on an aerial vehicle, and is configured to record an area of ground, wherein the first image data is indicative of a first sequence of first camera images;
recording second image data using a second camera, wherein the second camera is provided on an aerial vehicle, and is configured to record an area of ground, wherein the second image data is indicative of a second sequence of second camera images;
processing of the first and the second image data using the evaluation computer, comprising:
wherein the evaluation computer is configured for:
performing a first image analysis using a neural network and an artificial intelligence algorithm based on machine learning, of the first image data, wherein at least a first landing zone is hereby determined in the recorded area of ground;
performing a second image analysis, which is conducted free of use of the artificial intelligence algorithm, of the second image data, wherein at least a second landing zone is hereby determined in the recorded area of ground;
determining position coordinates of a clear landing zone, which is comprised by the first and second landing zones, when a comparison reveals that the first and second landing zones overlap in the area of ground, at least in the clear landing zone;
receiving position coordinates of a target landing site by the control processor of the aerial vehicle;
determining release characteristics, if when a comparison of the position coordinates of the clear landing zone and the position coordinates of the target landing site reveals a match; and
transmitting release characteristics, which are indicative of the availability of the target landing site for landing, to the control processor of the aerial vehicle; and
controlling of a flight movement of the aerial vehicle by the control processor, so as to land the aerial vehicle on the target landing site;
wherein the first camera is a visual imaging camera, and wherein performing the first image analysis comprises determining a ground obstacle via determining movement in the first image data based on an optical stream;
wherein the second camera is a thermal imaging camera, and wherein performing the second image analysis comprises determining heat in the second image data based on a threshold filter; and
wherein at least one of the first and second landing zones is determined as unsuitable for landing when, during the first and/or the second image analysis, it is determined that a ground obstacle is located in the one of the first and second landing zones.

9. The aerial vehicle according to claim 8, designed as an unmanned aerial vehicle.

10. The aerial vehicle according to claim 8, wherein the neural network is a convolutional neural network or a visual transformer.

* * * * *